United States Patent
Kuo et al.

(10) Patent No.: US 6,289,456 B1
(45) Date of Patent: Sep. 11, 2001

(54) HOOD INTRUSION AND LOSS OF AC POWER DETECTION WITH AUTOMATIC TIME STAMP

(75) Inventors: Sung Hsia Kuo; Alan M. Green, both of Houston, TX (US)

(73) Assignee: Compaq Information Technologies, Inc., Houston, TX (US)

( * ) Notice: Subject to any disclaimer, the term of this patent is extended or adjusted under 35 U.S.C. 154(b) by 0 days.

(21) Appl. No.: 09/136,865

(22) Filed: Aug. 19, 1998

(51) Int. Cl.[7] ............................................... G06F 11/30
(52) U.S. Cl. ................................................................. 713/200
(58) Field of Search ..................................... 713/200, 194, 713/340; 714/22, 36; 710/101, 102, 103; 312/223.2

(56) References Cited

U.S. PATENT DOCUMENTS

| | | | |
|---|---|---|---|
| 4,654,640 | * | 3/1987 | Carll et al. ............................. 340/568 |
| 5,406,260 | * | 4/1995 | Cummings et al. .................. 340/568 |
| 5,493,279 | * | 2/1996 | Dawson et al. .................. 340/825.32 |
| 5,568,611 | * | 10/1996 | Khatri et al. ........................... 713/200 |
| 5,574,786 | * | 11/1996 | Dayan et al. .......................... 713/202 |
| 5,877,697 | * | 3/1999 | Paas et al. ....................... 340/825.34 |
| 5,912,621 | * | 6/1999 | Schmidt ................................ 340/571 |
| 5,945,915 | * | 8/1999 | Cromer et al. ..................... 340/686.1 |
| 6,014,747 | * | 1/2000 | Fackenthall et al. ................ 713/200 |
| 6,032,257 | * | 2/2000 | Olarig et al. ......................... 713/200 |
| 6,041,375 | * | 3/2000 | Bass et al. ............................ 710/103 |

OTHER PUBLICATIONS

"Nonvolatile Timekeeping RAM", Dallas Semiconductor Data Sheet DS1642, Mar. 16, 1998, pp. 1–10.

* cited by examiner

*Primary Examiner*—Robert Beausoleil
*Assistant Examiner*—Scott Baderman
(74) *Attorney, Agent, or Firm*—Fletcher, Yoder & Van Someren (57) ABSTRACT

A battery-powered computer chassis intrusion detection circuit which stores the time and date that the chassis hood, components, or AC power was removed. When intrusion occurs, an alarm bit isolates the detection circuit oscillator from the circuit, effectively stopping a real time clock from incrementing the time and date. When the computer is powered back up, internal ROM checks to see if an alarm condition occurred. If so, the intrusion date and time is recorded and the user or administrator may be alerted.

26 Claims, 4 Drawing Sheets

HOOD INTRUSION AND LOSS OF AC POWER DETECTION WITH AUTOMATIC TIME STAMP

BACKGROUND AND SUMMARY OF THE INVENTION

The present invention relates to a method of theft protection for computers and/or computer related hardware.

BACKGROUND

Theft of Computer Components

As computers become more common in industry and at home, theft of the computers, of their components, and of information stored on them has become more prevalent. With advances in technology resulting in smaller and smaller components which may even be more expensive, theft becomes more widespread. Employees continue to be the primary source for losses due to theft. For example, employees who have compatible systems at home may be tempted to swap boards and input devices at work to repair or upgrade their systems at home. Employees are not the only threat. Repairmen, janitors, delivery-persons, other contractors, customers, invited guests, and even security people themselves may have an opportunity to take computer property.

The increasing use of plug-and-play and hot-swappable units has also been helpful for thieves, since these architectures have accelerated trends toward modular components which can be quickly attached or removed from a system.

In large companies with equally large computer data centers and inventories, it is a formidable task to keep an up-to-date inventory of the location of all computers and associated components. A major problem in computer asset control is the determination of when a system's hardware has been removed or stolen. Hard drives, memory, processors, and other expensive computer peripherals within the computer system can be easily removed and sold on the black market. Where a system may be used infrequently, or perhaps sits unattended for extended periods of time, a theft may be detected only when a person uses the system. If the thief is more adept, the theft may go undetected for quite some time, and only be discovered when the system undergoes routine maintenance by a technician. For example, it is very possible that a multi-processor system can have all except one of its processors stolen from the unit and the machine will still run. Similarly, unless the system is "smart" enough to indicate to an administrator that the memory configuration has changed, it is likely that it will take months before someone realizes the memory has been removed or stolen. The loss of these components are not only costly, but also impact productivity.

BACKGROUND

High-Tech Equipment Theft

Computers and related peripherals, and intellectual property are not the only target of high-tech theft. State-of-the-art instrumentation and test equipment are also prime candidates and are usually more expensive per unit volume than a typical home computer. Although less "marketable" than computer equipment, the theft of this type of equipment can represent a sizeable loss to companies using such equipment.

BACKGROUND

Current Detection Methods

Some intrusion detection methods incorporate hood intrusion detection architectures. Current hood intrusion implementations detect that the hood has been opened and alerts the system administrator during system Power-On Self Test ("POST"). If a system hood has been opened, regardless of whether the system is powered by AC power or not, a flag (alarm) will be set. This flag is then checked by the system's firmware during the next power-up. If the alarm bit is set, this indicates an intrusion has occurred and system integrity may have been compromised. Once the alarm bit is detected, the system administrator is notified and appropriate measures can be taken. Furthermore, the alarm bit can only be cleared via software which makes it more difficult to hack for even the most astute thief.

The main pitfall of the current hood intrusion implementation is that it only indicates to the administrator that the hood has been opened. It does not indicate when the hood was opened. So it is possible that a computer whose parts have been removed could be sitting for a couple of days or even longer before next power-up. Thus no one will know exactly when the theft occurred. This is problematic since without an accurate time, it becomes more difficult to narrow down a list of possible suspects.

Another problem associated with current intrusion detection implementations is logging. In current methods, the only indication of an intrusion is an alarm bit being set. It is possible that a power cycle of the system maintaining the alarm bit can be used to clear the bit. Such a security loophole can hide the evidence that an intrusion has taken place until physical discovery of the intrusion i.e., through missing parts. Some current implementations contain an embedded network interface that allows intrusion information to be sent to a server. However, network communications usually depend on a physical link which can easily be found and disabled. The inability to log an intrusion creates a problem in tracking the suspects and missing parts in that the time of the intrusion cannot be determined even if the alarm bit is not cleared.

Inovative Intrusion Detection and Time-Stamp Architecture

The disclosed architecture allows the system administrator to detect that a system hood has been opened. In addition, this invention accurately records the time and date of the hood intrusion, and allows the system administrator to correlate access to the system with other security measures (for example security code access to a computer room or surveillance camera data). By doing so, a theft occurrence can be narrowed down to some specific time frame (and hopefully, fewer suspects).

In the presently preferred embodiment, the innovative hood sensing circuitry essentially consists of a latch, a switch, an oscillator, decoupling circuits, and a real time clock ("RTC") chip. Because the circuitry is powered by a battery, the components used need to be capable of operating at a low voltage and also have low power dissipation. Additional circuitry can be used to recharge the battery or to enable the hood sensing circuitry to be powered by an outside source, including when the system itself is turned off. Thus conserving battery power and battery life.

Communication between the RTC and the system could be through, for example, a computer ISA bus interface. One general purpose output pin is used to allow software to clear the alarm condition. An additional general purpose input pin can be used for software interfacing where a program may be used to check the status of the hood alarm condition. Ideally, this circuitry can be implemented as part of an ASIC (Application-Specific Integrated Circuit) to reduce the cost of the feature.

Additionally, the components comprising the computer itself can be monitored for removal. Each component of the system e.g., power supply, memory, processor, hard drive, etc., can be connected to a dedicated detector circuit allowing tracking of the system at the part level. Additionally, the intrusion detector circuit can be employed in for example, equipment such as routers or other costly network equipment, or rack-mountable instrumentation housing multiple insertable boards.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Detection Architecture

Figure 1:
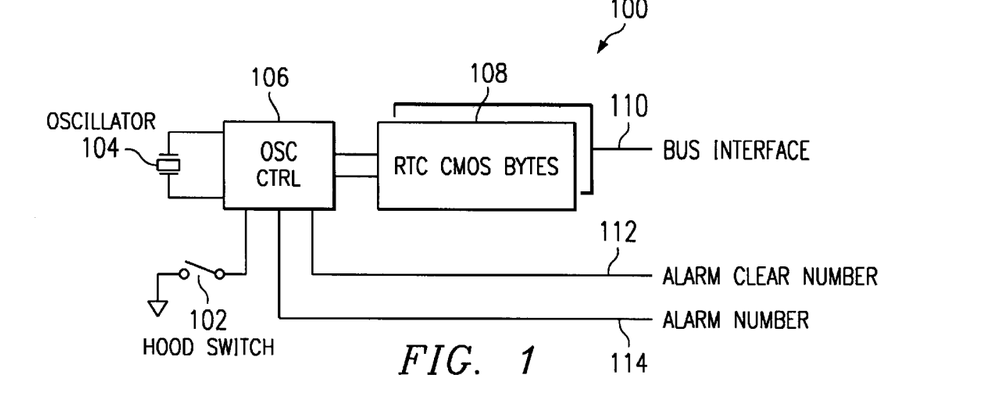
FIG. 1 shows a circuit diagram of the innovative detection circuit.

The presently preferred embodiment utilizes a simple RTC circuitry. FIG. 1 shows a circuit diagram of the detection circuit. This circuitry will time stamp the intrusion event when it occurs. The entire circuitry is backed up by battery. Powered backup allows detection of the intrusion condition even the equipment is without external power.

During the initial system power-up, firmware will prompt the user to enter the current date and time or using the internal system RTC to synchronize the hood-detect circuitry 100. This circuitry will use its own RTC counter 108 to mirror the current date and time. If the chassis hood is opened, a switch 102 opens and an alarm bit 114 is set. The alarm bit 114 controls the detection circuit control logic 106, directing it to isolate the oscillator 104 from the RTC counter 108. This condition will stop RTC counter 108, thus preserving the date and time of intrusion event. The oscillator 104 remains isolated from the RTC counter 108 even when the hood is closed until the software clears the alarm bit 114.

When the computer system is next powered up, the alarm bit 114 is read. If the alarm bit 114 is set, non-volatile memory (e.g.ROM) can be programmed to read the hood intrusion RTC date and time through the bus interface link 110 to record the intrusion time. The hood intrusion RTC date and time may be recorded in, for example, the system event log, or an administrator or user may be notified through a network adapter and/or modem. The system event log is used by the software to report to the system administrator that an intrusion has been detected and at what time. After recording the intrusion event, the ROM may be programmed to clear the intrusion alarm bit 114 by sending a clear command 112 and resetting the current date and time, thus restarting the intrusion detection function again. The ROM may also be used to display a message to the user during POST to warn the user of the intrusion event. Multiple entries can be specified in an event log, if desired, to create a history file of when the system has been opened. If the alarm bit 114 is not set, no intrusion has occurred and system functions continue as normal.

In addition to the above implementation, the alarm bit 114 can also serve as an interrupt to the system during run time, signalling a hood intrusion for an immediate response. The alarm bit 114 can also be configured to associate reporting and acknowledgement of each hood-opening event in the system event log to indicate whether an administrator has seen the intrusion alert or not.

Figure 2:
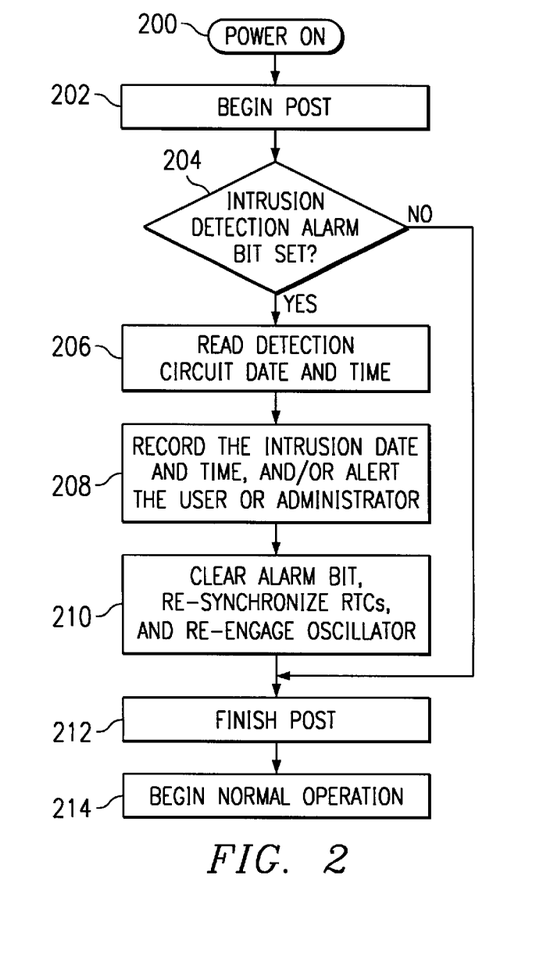
FIG. 2 shows a flowchart of the general intrusion alert and date/time stamp process.

FIG. 2 shows a flowchart of the general intrusion alert and date/time stamping process. When a system is powered on (Step 200), the computer initiates the POST process (Step 202). The BIOS program checks to see if the intrusion detection alarm bit is set (Step 204). (The BIOS program is used in this particular embodiment, but alternatively, some other program stored in ROM or non-volatile memory could be used.) If the bit is not set, the POST process finishes (Step 212), and normal computer operation begins (Step 214). On the other hand, if the alarm bit is set (Step 204), the date and time of the detection circuit, indicating the time of the intrusion, is read by the BIOS (Step 206). Once the date and time of intrusion has been established it can be recorded for later reference, the user of the system or the administrator can also be alerted as to the intrusion (Step 208). After the desired action has taken place (Step 208), the alarm bit is cleared, the RTC is resynchronized, if necessary, and the oscillator is reengaged (Step 210).

Figure 6:
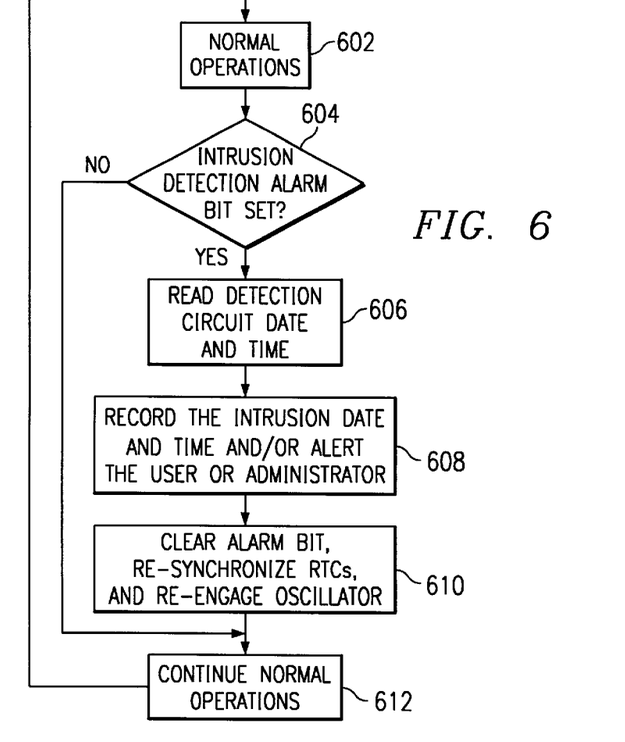
FIG. 6 shows a flowchart of the general intrusion alert and date/time stamp process during run time.

The general intrusion aler t and date/time stamping process during run time depicted in the flowchart of FIG. 6 is similar to the process depicted in FIG. 2. As part of normal operation 602, the intrusion detection alarm bit is polled at a certain frequency (Step 604). The alarm bit can also be configured to generate a system interrupt to indicate an intrusion event. If the alarm bit is set, the date and time of the detection circuit, indicating the time of the intrusion, is read by the BIOS (Step 606). Once the date and time of intrusion has been established it can be recorded for later reference, the user of the system or the administrator can also be alerted as to the intrusion (Step 608). After the desired action has taken place (Step 608), the alarm bit is cleared, the RTC is resynchronized, if necessary, and the oscillator is reengaged (Step 610). Normal operation then continues 612.

Hood Intrusion Embodiment

Figure 3:
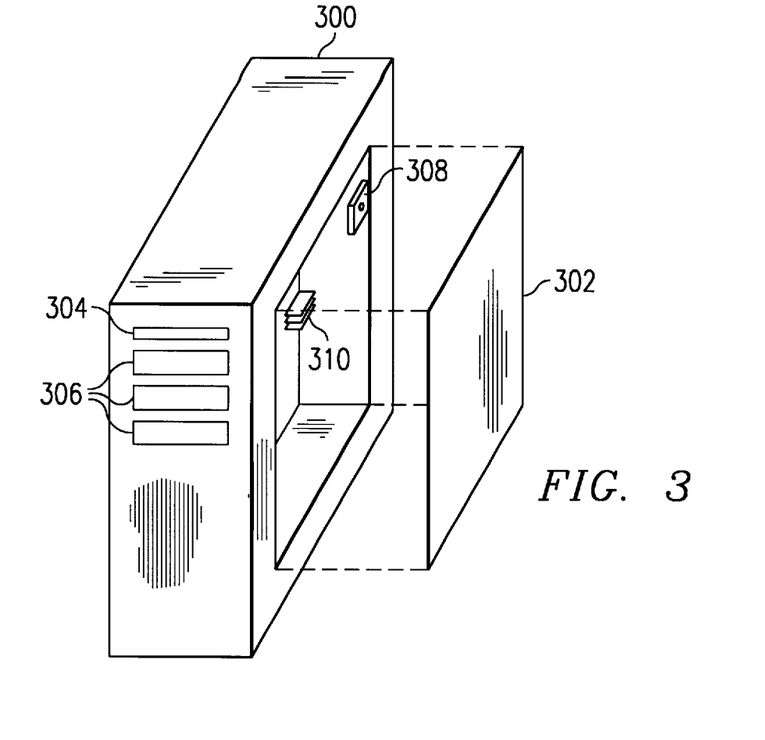
FIG. 3 shows a physical diagram of a computer with the intrusion detection circuit.

FIG. 3 shows a physical diagram of a computer with the intrusion detection circuit. In this particular embodiment, a chassis 300 accommodates a number of components which support the operation of a system. For example, expansion boards 306, video board 304, and memory 310 may be components supporting a computer system. The chassis cover 302 is shown as removed to provide access to the components that comprise the system. The innovative detection circuit 308 is fitted to sense the removal of the chassis cover 302 from the chassis 300. The detection circuit 308 senses the loss of contact with the chassis cover 302 and stores the time and date of the event.

Instrumentation System Embodiments

Figure 4A:
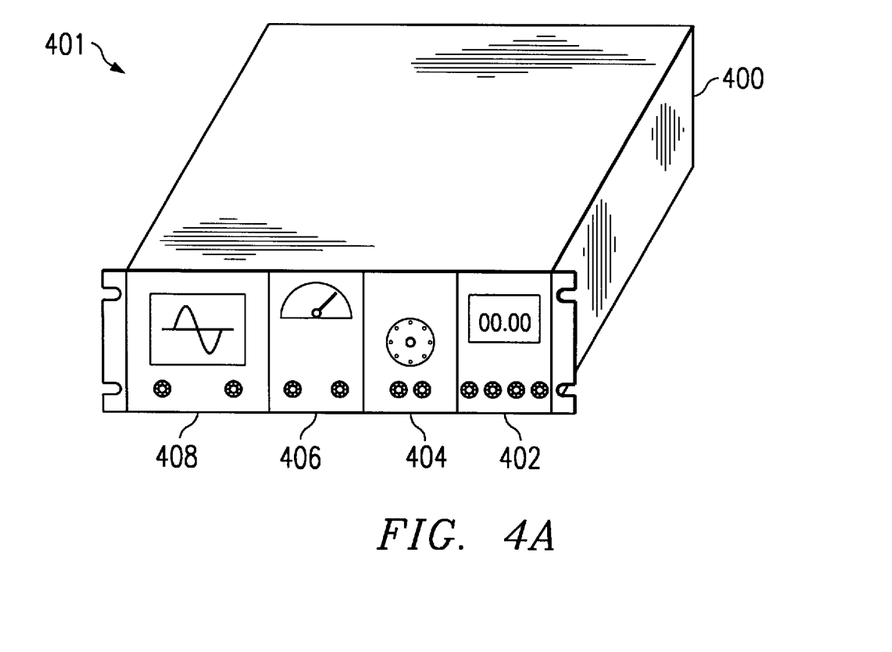
FIGS. 4A and 4B show a physical diagram of a piece of high-tech modular equipment with the intrusion detection circuit.
Figure 4B:
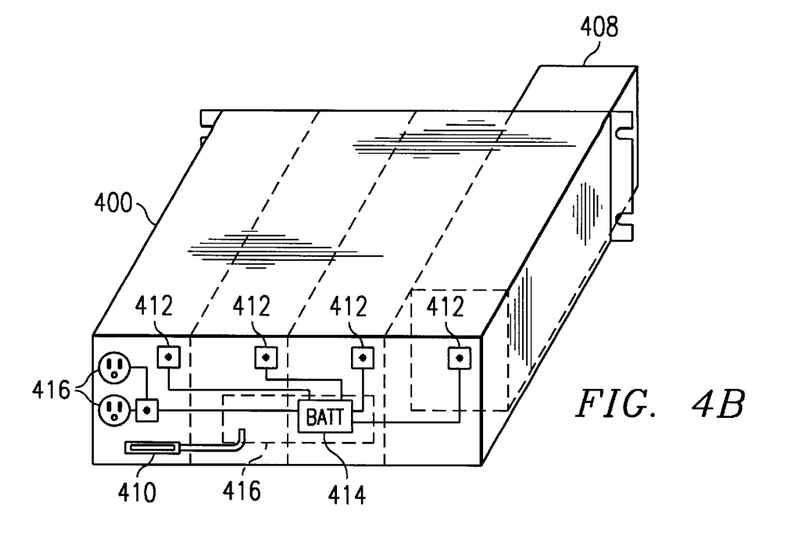

FIGS. 4A and 4B show a physical diagram of a high-tech modular system 401 with the intrusion detection circuit. In this particular embodiment, a chassis 400 accommodates a number of plug-in modules which provide several different functions. For example, an oscilloscope 408, a power supply 406, a frequency generator 404, and a digital multimeter 402 may be inserted into this chassis to provide a technician with the test equipment he or she needs to perform a task. In this particular modular configuration, the chassis cover does not need to be removed to access expensive components. The modules can be simply removed from the front of the chassis. In this case, the innovative detection circuit 412 may be fitted to sense the removal of any module.

FIG. 4B shows a rear-view of the chassis 400. A module 408 is shown partially removed. Detection circuit 412 senses the loss of contact with the module and stores the time and date of the event. Each of the detection circuits may be powered by a central battery 414 to provide backup power when the system 401 is powered down, and to reduce the costs associated with dedicated batteries for each circuit 412. An interface board 416 accommodates interface circuitry used for communicating to the modules via a computer or other control and data acquisition system, through a connector 410 (which may be any industry standard bus). In this way, when the system 401 is next powered-up, the user may be alerted as to when the module was removed (although it would be obvious the module is missing).

Intrusion detection can also be implemented in systems which are hot-pluggable, where the module may be removed while the power is still being applied to the system 401. In this scenario, the detection circuit 412 may still store the time and date of the removal event and report the occurrence to an operator which may be in a different location. Similarly, intrusion detection can be implemented on power supplies, hard drives, or other components.

Computer Embodiment

Figure 5:
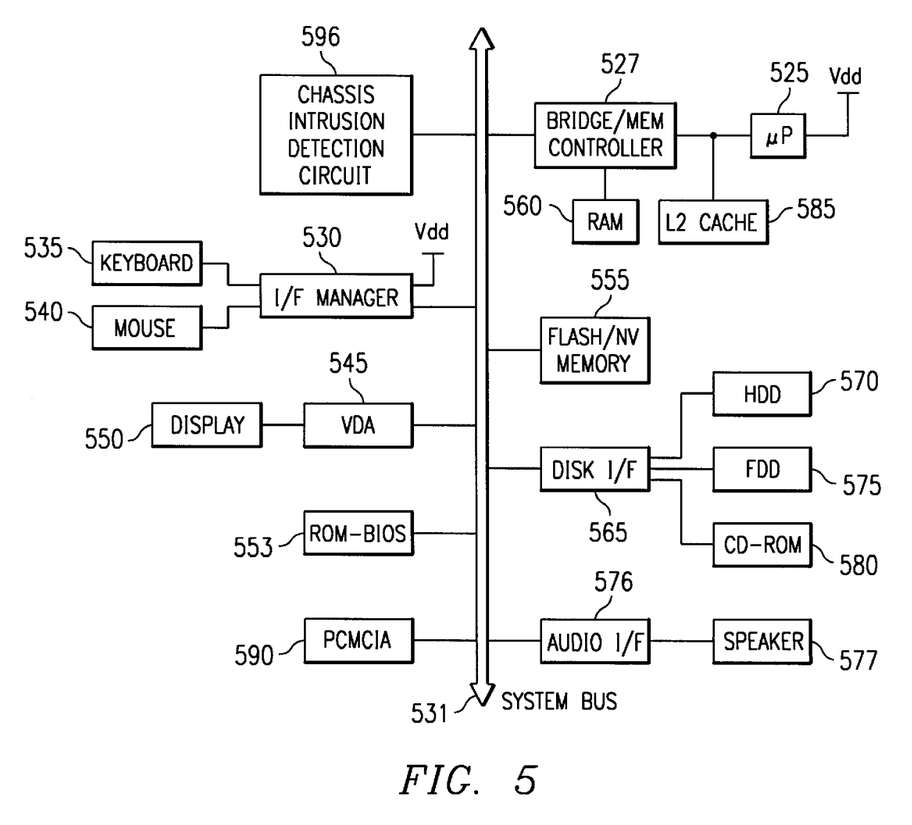
FIG. 5 shows a block diagram of a computer system according to the presently preferred embodiment.

FIG. 5 shows a possible computer architecture which can use the innovative intrusion detection architecture. The computer system, in this embodiment, includes in this example:

user input devices (e.g. keyboard 535 and mouse 540);
at least one microprocessor 525 which is operatively connected to receive inputs from the input devices, across perhaps a system bus 531, through an interface manager chip 530 (which also provides an interface to the various ports); the microprocessor interfaces to the system bus through perhaps a bridge controller 527;
a memory (e.g. flash or non-volatile memory 555, RAM 560, and BIOS 253), which is accessible by the microprocessor;
a data output device (e.g. display 550 and video display adapter card 545) which is connected to output data generated by the microprocessor 525;
a magnetic disk drive 570 which is read-write accessible, through an interface unit 565, by the microprocessor 525; and an intrusion detection circuit 596.

Optionally, of course, many other components can be included, and this configuration is not definitive by any means. For example, the computer may also include a CD-ROM drive 580 and floppy disk drive 575 which may interface to the disk interface controller 565. Additionally, L2 cache 585 may be added to speed data access from the disk drives to the microprocessor 525, and a PCMCIA 590 slot accommodates peripheral enhancements. The computer may also accommodate an audio system for multimedia capability comprising a sound card 576 and a speaker(s) 577.

Alternative Embodiment

Detection of Loss of AC Power

The same concept can be used to report when the system AC power is removed (for example, in systems that have an auxiliary power input). In FIG. 4B, a detection circuit may be connected to sense loss of AC power to the system 401. The detection circuit 412 may be interfaced to the power system (e.g., power inputs 416) to latch a signal to isolate the RTC oscillator. This latch needs to be able to hold the data when AC power is removed. The latch can be powered by an alterative source such as a battery to accomplish this data retention. This latch signal, along with the intrusion bit, can be inspected by software during power-up. The time of AC power loss can then be read and logged.

Alternative Embodiment

Multiple Detection Circuits

It is possible to have a dedicated intrusion detection circuit for several or all components of a system. At least two different approaches can be used for multiple intrusion detection circuits. First, each component which is to be monitored can be connected to a detector circuit with its own RTC chip. Each detector circuit can be tied to a single general purpose input for alarm purposes. Software can be used to poll each device in the event of an alarm. If an alarm is asserted by any of the detector circuits, the time and status of each component can then be determined. The above approach allows for individual monitoring and time stamping of multiple devices.

Second, a multiple switch daisy chain can be employed. Each component shares one RTC and detector circuit. When any one of the monitored components is removed, an alarm is asserted. Using this approach, provides a more cost effective implementation. However, if multiple components are removed there is no indication of which components were removed at a particular time.

Alternative Embodiment

ASIC Implementation

Figure 7:
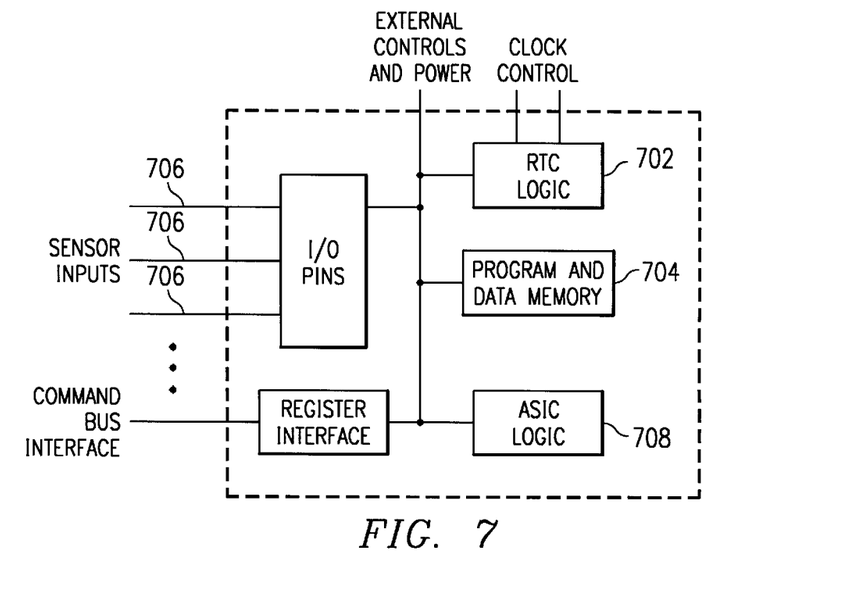
FIG. 7 depicts an example ASIC which utilizes an external crystal and external battery in addition to embedded RTC logic.

RTC circuitry in most computer systems is implemented as a part of an ASIC (typically as a part of super IO ASIC or Core Logic). FIG. 7 depicts an example ASIC. The ASIC utilizes an external crystal and external battery in addition to the embedded RTC logic 702. An ASIC of this design typically includes non-volatile memory 704 (battery backed up) referred to as CMOS RAM to track the RTC activity (date and time). The ASIC will also usually include additional CMOS RAM (about 128 bytes) that can be used for general purpose storage space. The storage space and non-volatile memory of the ASIC can be taken advantage of by designing an intrusion detection function into the ASIC.

A dedicated input pin 706 can be used to monitor the current condition. When an alarm condition occurs e.g., a hood is opened, the input will be asserted. The ASIC logic 708 is programmed to monitor the input for alarm conditions. When the alarm is asserted, the ASIC can simply copy the current value of its RTC date/time register to is general purpose storage space 704. Additionally, the ASIC can set a status bit in its registers 704 or assert a signal to notify the system that an alarm condition has occurred. BIOS can then read the specified location and get the necessary time stamp information to process the intrusion condition.

An ASIC can use multiple inputs 706 to monitor multiple intrusion/removal events. Since the RTC 702 of the ASIC is not latched and therefore always running, individual intrusion times can be determined separately without the added cost of additional RTCs. In addition, multiple intrusions on the same device e.g., hood open several times, can be detected and recorded as long as different general purpose locations are used for each value. A table in the CMOS 704 can be created to record intrusion date/time, and intrusion source. The data in the table creates a history file which can track multiple intrusions at multiple sources. The table can be protected, by software for example, to ensure an administrator or user has acknowledged the intrusion events.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

According to a disclosed class of innovative embodiments, there is provided: a method of detecting removal of a component of an electrical system, comprising the steps of triggering a detection circuit upon removal of a component; and storing non-volatile data related to when said component was removed.

According to another disclosed class of innovative embodiments, there is provided: a method for detecting loss of power to a portion of a system, comprising the steps of triggering a detection circuit upon loss of power; and storing non-volatile data related to when said loss of power occurred.

According to another disclosed class of innovative embodiments, there is provided a method for detecting removal of a component of a system, comprising the steps of: when a component is removed generating a signal; using said signal to stop a clock; and recording the value of said clock.

According to another disclosed class of innovative embodiments, there is provided a component intrusion detection device, comprising a component; a switch operatively connected to said component such that the absence of contact between said component and said switch changes the state of said switch; a real time clock and oscillator operatively connected to said switch such that a change of state in said switch can isolate said oscillator from the counter of said real time clock; and memory programmed to read the value of said real time clock.

According to another disclosed class of innovative embodiments, there is provided: a real-time clock and theft detection circuit, comprising programmed logic; non-volatile memory operatively connected with said programmed logic; real-time clock logic connected with said programmed logic and said non-volatile memory; at least one input pin connected to receive an intrusion detection signal and connected to said programmed logic; a switch operatively connected to a component such that the absence of contact between said component and said switch changes the state of said switch; and a real time clock and oscillator operatively connected to said switch such that a change of state in said switch can isolate said oscillator from the counter of said real time clock; wherein said programmed logic reads the value of said real time clock and stores said value in said non-volatile memory.

According to another disclosed class of innovative embodiments, there is provided: a computer system, comprising: a chassis with a removable cover, said removable cover providing internal access to said chassis, said chassis housing internal components of said computer, said internal components comprising one or more microprocessors which are operatively connected to detect inputs from an input device, memory which is connected to be read/write accessible by said microprocessor, one or more devices for mass storage of data, and an output device operatively connected to receive outputs from said microprocessor; one or more power supplies connected to provide power to said internal components; and a detection circuit which stores data related to when said components or said removable cover is removed.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, a stop watch type mechanism can be used in place of a real time clock. The stop watch would act as a counter, indicating elapsed time instead of an actual time.

For another example, different forms of non-volatile RAM (NVRAM) can be used. NVRAM which automatically backs up to flash memory or ROM in the event of a power loss can be used to avoid having to isolate the RTC crystal.

For another example, intrusion detection can include motion detection in addition to actual opening of chassis hood or removal of system components. Intrusion detection can also include use of GPS or other positioning information to determine if a system or component has been moved from a predefined operating area.

For another example, the switch used to indicate intrusion does not have to be of any particular type e.g., a quick switch, mechanical relay, FET, or other switch may be used, depending on the application.

For another example, the logging described in the presently preferred embodiment is held in non-volatile memory. However, in the event of a complete power loss, any event log could be written to EEPROM for permanent storage.

For another example, the RTC clock, intrusion detection logic, and non-volatile memory can be combined in an application specific integrated circuit (ASIC).

What is claimed is:

1. A method of detecting removal of a component of an electrical system, comprising the steps of:
   triggering a detection circuit upon removal of a component; and
   storing non-volatile data related to when said component was removed, wherein the basis of said data is user dependent.

2. A method of detecting removal of a component of an electrical system, comprising the steps of:
   triggering a detection circuit upon removal of a component; and
   storing non-volatile data related to when said component was removed, wherein said component is part of a system and the basis of said data is synchronized with said system.

3. A method of detecting removal of a component of an electrical system, comprising the steps of:
   triggering a detection circuit upon removal of a component; and
   storing non-volatile data related to when said component was removed, and wherein said data related to removal of the component creates a history file.

4. A method of detecting removal of a component of an electrical system, comprising the steps of:
   triggering a detection circuit upon removal of a component, wherein said component is a hot-pluggable device; and
   storing non-volatile data related to when said component was removed.

5. A method for detecting loss of power to a portion of a system, comprising the steps of:
   triggering a detection circuit upon loss of power, wherein said detection circuit is powered by a battery; and
   storing non-volatile data related to when said loss of power occurred.

6. A method for detecting removal of a component of a system, comprising the steps of:
   when a component is removed, generating a clock signal;
   using said signal to stop a clock, wherein said clock remains stopped even if said component is replaced; and
   recording the value of said clock.

7. A method for detecting removal of a component of a system, comprising the steps of:
   when a component is removed, generating a clock signal;
   using said signal to stop a clock; and
   recording the value of said clock only after said system is powered up.

8. A method for detecting removal of a component of a system, comprising the steps of:
   when a component is removed, generating a clock signal;
   using said signal to stop a clock;
   recording the value of said clock;
   clearing said signal after said recording step; and
   resetting said clock after said recording step.

9. A method for detecting removal of a component of a system, comprising the steps of:
   when a component is removed, generating a clock signal;
   using said signal to stop a clock; and
   recording the value of said clock, wherein multiple components can trigger said detection method.

10. A method for detecting removal of a component of a system, comprising the steps of:
    when a component is removed, generating a clock signal;
    using said signal to stop a clock; and
    recording the value of said clock, wherein data related to the removal of more than one component can be stored.

11. A component intrusion detection device, comprising:
    a component;
    a switch operatively connected to said component such that the absence of contact between said component and said switch changes the state of said switch;
    a real time clock and oscillator operatively connected to said switch such that a change of state in said switch can isolate said oscillator from a counter of said real time clock; and
    memory programmed to read a value of said real time clock.

12. The device of claim 11 wherein said real time clock is set by a user of said component.

13. The device of claim 11 wherein said component is a part of a system and said real time clock is synchronized with said system.

14. The device of claim 11 wherein when said switch changes state an alarm bit is generated.

15. The device of claim 11 further comprising
    a display warning a user of the component of an intrusion upon power-on self-test.

16. The device of claim 11 wherein multiple switches can be connected to said real time clock and said oscillator.

17. The device of claim 11 further comprising non-volatile memory wherein more than one of said value can be stored.

18. The device of claim 11 further comprising a battery to power said component intrusion detection device.

19. A real-time clock and theft detection circuit, comprising:
    programmed logic;
    non-volatile memory operatively connected with said programmed logic;
    real-time clock logic connected with said programmed logic and said non-volatile memory;
    at least one input pin connected to receive an intrusion detection signal and connected to said programmed logic;
    a switch operatively connected to a component such that the absence of contact between said component and said switch changes the state of said switch; and
    a real time clock and oscillator operatively connected to said switch such that a change of state in said switch can isolate said oscillator from a counter of said real time clock;
    wherein said programmed logic reads a value of said real time clock and stores said value in said non-volatile memory.

20. The circuit of claim 19 wherein when said switch changes state an alarm bit is generated.

21. The circuit of claim 19 wherein said real time clock remains stopped even if said switch reverts to its former state.

22. The circuit of claim 19 wherein multiple switches can be connected to said real time clock and said oscillator.

23. The circuit of claim 19 further comprising non-volatile memory wherein more than one of said value can be stored.

24. The circuit of claim 19 further comprising a battery to power said real time clock and theft detection circuit.

25. A computer system, comprising:

a chassis with a removable cover, said removable cover providing internal access to said chassis, said chassis housing internal components of said computer, said internal components comprising:
one or more microprocessors which are operatively connected to detect inputs from an input device;
memory which is connected to be read/write accessible by said microprocessor;
one or more devices for mass storage of data;
an output device operatively connected to receive outputs from said microprocessor;

one or more power supplies connected to provide power to said internal components; and a detection circuit which stores data related to when said components or said removable cover is removed, wherein said detection circuit is a loss-of-power detection circuit operatively connected to sense the presence of input power to one or more of said power supplies, and which stores data related to when said input power is removed.

26. A computer system, comprising:

a chassis with a removable cover, said removable cover providing internal access to said chassis, said chassis housing internal components of said computer, said internal components comprising:
one or more microprocessors which are operatively connected to detect inputs from an input device;
memory which is connected to be read/write accessible by said microprocessor;
one or more devices for mass storage of data;
an output device operatively connected to receive outputs from said microprocessor;

one or more power supplies connected to provide power to said internal components;

detection circuit which stores data related to when said components or said removable cover is removed; and a multiple switch daisy chain circuit connected to each said component or said removable cover to be monitored for removal.

* * * * *